May 17, 1966 E. S. GILCHRIST 3,252,102

FINELY ADJUSTED SIGNAL CALIBRATING CIRCUIT

Filed May 23, 1963

INVENTOR
EDGAR S. GILCHRIST
BY
Christie, Parker & Hale
ATTORNEYS.

United States Patent Office 3,252,102
Patented May 17, 1966

3,252,102
FINELY ADJUSTED SIGNAL CALIBRATING CIRCUIT

Edgar S. Gilchrist, Fairfield, Conn., assignor to Consolidated Electrodynamics Corporation, Pasadena, Calif., a corporation of California
Filed May 23, 1963, Ser. No. 282,715
5 Claims. (Cl. 328—149)

The present invention is directed to a novel signal calibrating circuit for developing electrical signals having a finely controlled magnitude.

In many electronic systems it is desired to develop electrical signals which have a finely controlled magnitude relative to an input signal. Such electrical signals are often utilized as reference signals in the control, calibration and/or signal detection of electrical signals of unknown or varying magnitude. In the past, to develop electrical signals having a finely adjusted magnitude from a known electrical signal, or to develop an electrical signal having a magnitude which maintains a finely adjusted ratio with a signal of a known magnitude, electrical circuit designers have employed either voltage divider arrangements including resistance potentiometers or transformers employing tap changers. Finely adjusted potentiometers have the disadvantage of being relatively expensive and in addition are subject to inaccurracies caused by shock or temperature changes which vary the position of the potentiomer's movable arm along its control resistor. Similar to the potentiometer, transformers utilizing tap changers are also critical in design and are relatively expensive.

In contrast to such conventional apparatus, the present invention is relatively inexpensive, simple in design, and is insensitive to shock or changes in surrounding environmental conditions.

Basically, the apparatus of the present invention comprises at least two transformers. The first transformer includes primary, secondary, and ternary windings. The second transformer includes a primary and a secondary winding. The ternary winding is coupled in a series loop with the primary winding of the second transformer while the secondary windings of the two transformers are connected in series.

The primary winding of the first transformer is arranged to receive an input signal of known magnitude which produces a calibrated reference signal across the series connected secondary windings.

In order to finely adjust the magnitude of the reference signals the number of turns in the ternary winding is substantially less than the number of turns in the primary winding of the first transformer. Thus, in response to the input signal applied to the primary winding, a voltage, referred to as a control signal, is developed in the ternary winding having an amplitude which is many times smaller than that of the input signal. The control signal, thus developed, is applied to the primary winding of the second transformer. Preferably the primary winding of the second transformer has a greater number of turns than the ternary winding. Accordingly, the signal developed in the primary winding of the second transformer is substantially less per turn than that developed in the ternary winding and produces a signal having a finely controlled magnitude in the secondary winding of the second transformer. Due to the finely controlled magnitude of the signal developed in the secondary winding of the second transformer the reference signal as developed across the series connected secondary windings also has a finely controlled magnitude.

Since the present invention, as described, merely employs two or more transformers it is simple and inexpensive in design and is not subject to changes in surrounding environmental conditions.

Such an apparatus is particularly useful as a circuit for calibrating the magnitude of an unknown voltage relative to a standard and for detecting changes in the magnitude of a varying signal relative to a reference signal.

The above as well as other featurese of the present invention may be more clearly understood by reference to the following detailed description when considered with the drawings in which.

Figure 1:
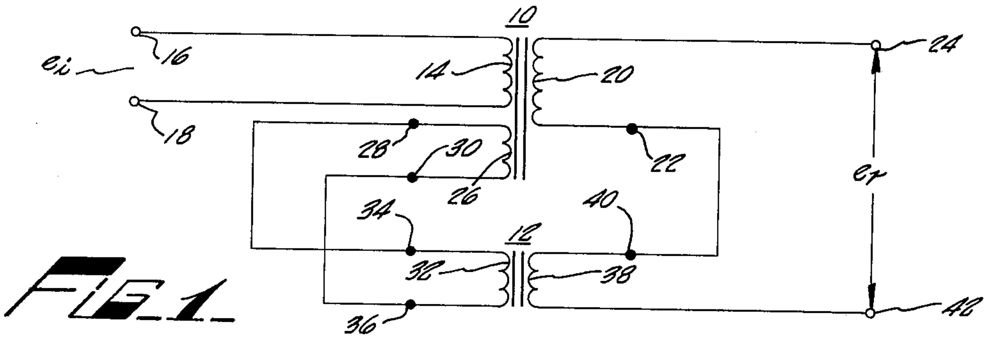
FIGURE 1 is a schematic representation of the basic form of the present invention.

As illustrated in FIGURE 1, the basic form of the present invention includes a pair of transformers 10 and 12. Preferably, the transformers employed in the present invention include toroidal cores composed of magnetic material having a high permeability. With such transformers the magnetic flux developed therein is confined almost entirely to the core itself. Thus, changes in the core permeability with time and temperature modify only the small amount of leakage flux which is not confined to the core itself and have only a second order effect upon the turns ratio of the transformers.

The first transformer 10 includes a primary winding 14 having input terminals 16 and 18, a secondary winding 20 having output terminals 22 and 24 and a ternary winding 26 having output terminals 28 and 30. The primary winding 14 is arranged to receive an input signal $e_1$ between its input terminals 16 and 18.

The second transformer 12 includes a primary winding 32 having input terminals 34 and 36 and a secondary winding 38 having output terminals 40 and 42. The ternary winding 26 is coupled in a series loop with the primary winding 32 of the transformer 12, the output terminals 28 and 30 of the ternary winding 26 being connected to the input terminals 34 and 36, respectively, of the primary winding 32. The secondary windings 20 and 38 of the transformers 10 and 12, respectively, are connected in series, the output terminal 22 of the secondary winding 20 being connected to the output terminal 40 of the secondary winding 38. In this arrangement the reference signal $e_r$ is developed between the output terminals 24 and 42.

As represented, the ternary winding 26 has a number of turns which is substantially less than the number of turns in the primary winding 14. Thus, in response to the input signal applied to the input terminals 16 and 18 a signal is developed in the ternary winding having a magnitude which is substantially less than that of the input signal. The signal developed in the ternary winding 26 may be referred to as a control signal and is applied across the primary winding 32 of the transformer 12.

As illustrated, the number of turns in the primary winding 32 is greater than the number of turns in the ternary winding 26. Thus, the signal developed in the primary winding 32 is substantially less per turn than the control signal developed in the ternary winding 26. The electrical signal developed in the primary winding 32 therefore develops a signal in the secondary winding 38 having a finely controlled magnitude which when added to the electrical signal developed in the secondary winding 20 of the transformer 10 produces the reference signal having a finely controlled magnitude between the output terminals 24 and 42.

In particular, it can be shown that the general expression for the reference voltage developed between the output terminals 24 and 42 is as follows:

$$e_r = \pm e_i(\pm N_1 \pm N_2 \cdot N_3) \qquad (1)$$

where $e_i$ is the input signal, $N_1$ is the turns ratio of the secondary winding 20 to the primary winding 14, $N_2$ is a turns ratio of the ternary winding 26 to the primary winding 14, and $N_3$ is the turns ratio of the secondary winding 38 to the primary winding 32. By controlling the turns ratio $N_2$ to be substantially less than unity (by employing a small number of turns in the ternary winding 26) it is clear from the above expression that the magnitude of a reference signal may be critically controlled merely by controlling the turns ratio $N_3$. Accordingly, in practice, once the turns ratio $N_1$ is established, critical control over the magnitude of the reference signal is achieved by controlling the number of turns wound in the secondary winding 38 relative to the number of turns wound in the primary winding 32 of the transformer 12. In practice such critical control is easily achieved with transformers employing toroidal cores since it is a simple task to thread the output winding turns through the cores themselves. In fact, due to the ease with which the output windings may be threaded through the transformer cores, the transformers themselves may be considered as adjustable.

Having once wound the transformers 10 and 12 the ratio between the input signal and the reference voltage signal is maintained irrespective of changes in environmental conditions surrounding the transformers. In addition, since the apparatus illustrated in FIGURE 1 is composed of only two transformers, it is extremely simple in design and very inexpensive relative to the conventional signal calibration circuits previously described.

Furthermore, since transformers are relatively insensitive to load resistances coupled to their output windings, a number of separate series connected output windings may be threaded through the cores of the transformers comprising the basic calibration unit of the present invention. Such an arrangement would provide a plurality of separate calibrating channels each employing the same core members a common signal source to generate a plurality of reference signals, which by varying the number of turns for each output winding would each be of a different finely controlled magnitude.

Alternatively, when a plurality of separate series connected output windings are employed, a selector switch may be utilized to select any one of the output windings for connection to a common output, thereby providing a single channel calibrating apparatus capable of developing a reference signal having several different finely adjusted magnitudes.

Figures 2, 3:
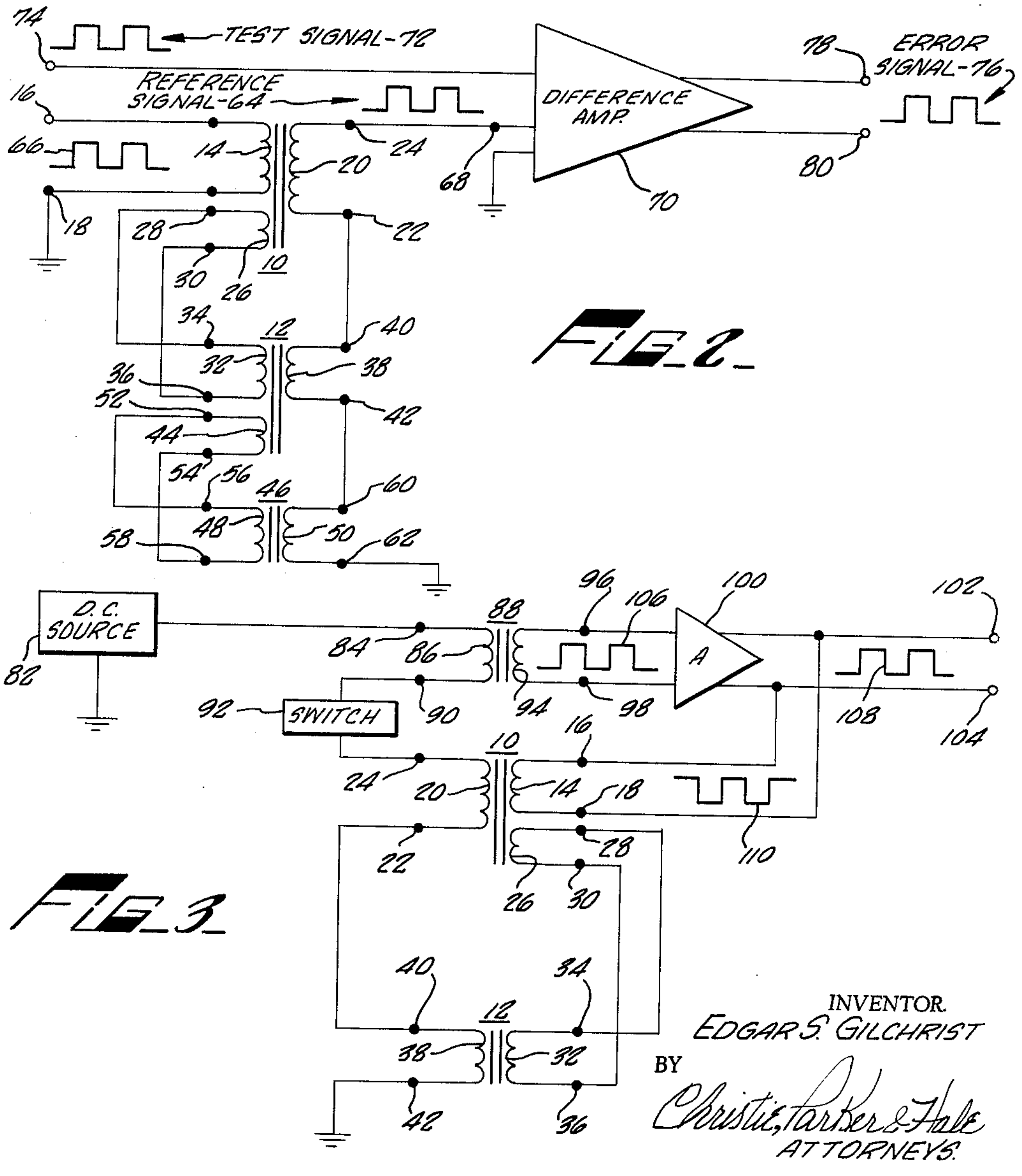
FIGURE 2 is a schematic representation of an error detecting system employing the present invention.
FIGURE 3 is a schematic, block diagram representation of a signal detection system employing the present invention in a feedback loop.

It is also to be appreciated from the above description of the basic form of the present invention that additional transformers employing a combination of three windings may be included to provide an even closer control over the magnitude of the reference signal. Such an arrangement of the present invention is illustrated in FIGURE 2 as forming the part of an error detecting system. As represented, the signal calibrating circuit of the present invention, in addition to the transformers 10 and 12 as previously described, includes a ternary winding 44 in the transformer 12 and an additional transformer 46 having a primary winding 48 and a secondary winding 50. The ternary winding 44 includes output terminal 52 and 54 which are coupled to the input terminals 56 and 58 of the primary winding 48. Thus, as illustrated, a ternary winding 44 is connected to form a closed loop with the primary winding 48.

The secondary winding 50 includes output terminals 60 and 62. The output terminal 60 is coupled to the output terminal 42 of the secondary winding 38 while the output terminal 62 is coupled to ground. Thus, a series circuit is formed of the secondary windings 20, 38 and 50.

As represented, the ternary winding 44 has a number of turns which is substantially less than the number of turns in the primary winding 32 of the transformer 12. Thus, in response to the control signal applied to input terminals 34 and 36, a signal is developed in the ternary winding 44 having a magnitude which is substantially less than that of the control signal. The signal developed in the ternary winding 44 may be termed the second control signal and the control signal developed in the ternary winding 26 as the first control signal. The second control signal is applied across the primary winding 48 of the third transformer 12.

As illustrated, the number of turns in the primary winding 48 is greater than the number of turns in the ternary winding 44. Thus, the signal developed in the primary winding 48 is substantially less per turn than the second control signal developed in the ternary winding 44. Since the magnitude of the second control signal is substantially less than that of the first control signal, this means that the signal developed in the secondary winding 50 is even more finely controlled in magnitude per turn than the signal developed in the secondary winding 38. Thus, when th signal developed in the secondary winding 50 is added in series to the signals developed in the secondary windings 38 and 20 a reference signal is developed between the output terminals 62 and 24 having a magnitude which is adjusted to an extremely fine degree.

In particular, it can be shown that the reference voltage developed in the signal calibrating circuit between the output terminals 62 and 24 may be represented by the following general expression:

$$e_r = \pm e_i(N_1 \pm N_2 \cdot N_3 \pm N_2 \cdot N_4 \cdot N_5) \qquad (2)$$

where $N_4$ is the turns ratio of the ternary winding 44 to the primary winding 32 and $N_5$ is the turns ratio of the secondary winding 50 to the primary winding 48. By controlling the magnitude of the turns ratios $N_2$ and $N_4$ to be substantially less than unity extremely fine control over the magnitude of the reference signal is achieved merely by controlling the turns ratios $N_3$ and $N_5$.

Although the general expressions for the reference voltage developed by the present invention are given by the expressions (1) and (2), it is to be noted that by controlling the actual turns ratios of the primary and ternary windings in the transformers relative to the magnitude of the input voltage signals to provide a ten-to-one voltage relationship per turn, that the magnitude of the reference voltage may be directly determined by the number of turns in the output winding in each transformer and as previously discussed may be adjusted by controlling the number of turns in the series connected output windings. For example, if the number of turns in the winding 14 is such as to establish a ratio of ten millivolts per turn with the input voltage and a ten-to-one turns ratio is maintained between the primary windings 32 and 48 and their associated ternary windings 26 and 44, respectively, the following expression for the reference voltage $e_r$ may be derived:

$$e_r = \pm 10 n_1 \pm n_2 \pm .1 n_3 \text{ millivolts per turn} \qquad (3)$$

where $n_1$ is the number of turns in the secondary winding 20, $n_2$ is the number of turns in the secondary winding 38, and $n_3$ is the number of turns in the secondary winding 50. Thus, by selectively threading the series connected output windings through the cores of the transformers 10, 12 and 46, any desired finely controlled predetermined millivolt reference voltage may be developed.

In the error detecting apparatus illustrated in FIGURE 2 the signal calibrating network of the present invention functions to generate a reference signal represented by way of example only by the square wave 64 in response to an input signal illustrated by way of example only, by the square wave 66. The reference signal 64 is applied to an input terminal 68 of a difference amplifier 70. The reference signal 64 as applied to the difference amplifier is utilized as a standard against which a test signal represented by the waveform 72 is compared. The test signal 72 is applied to the input terminal 74 of the difference amplifier 70. The reference signal and the test signal are subtracted in the difference amplifier 70, any difference therebetween giving rise to an error signal 76 between the output terminals 78 and 80 of the difference amplifier.

As previously mentioned, the signal calibrating circuit of the present invention is particularly useful in providing a feedback loop for a signal detection system. Such a circuit arrangement is illustrated in FIGURE 3 in which the present invention is utilized to provide a finely controlled feedback ratio in a signal detection system for detecting the magnitude of electrical signals generated at a D.C source 82. The signal detection system illustrated in FIGURE 3, exclusive of the signal calibrating circuit of the present invention, is substantially as described in my co-pending patent application Serial No. 75,461, filed December 9, 1960. Accordingly, for a detailed understanding of the over-all signal detection system reference should be made to my co-pending patent application.

As illustrated, the source of D.C. signals 82 is coupled to an input terminal 84 of the primary winding 86 of a transformer 88. The primary winding 86 also includes an input terminal 90 which is connected to a switch 92. The switch 92, in turn, is connected to the input terminal 24 of the primary winding 20 to complete a series current path from the D.C. source 82 through the windings 86, 20 and 38 when the switch 92 is closed.

The transformer 88, in addition to the primary winding 86, includes a secondary winding 94, the output terminals of which are coupled to the input terminals 96 and 98, respectively, of an amplifier 100. The amplifier 100 includes a pair of output terminals 102 and 104 between which is developed an electrical signal proportional to the magnitude of the direct current signals generated at the D.C. source 82.

The output terminals 102 and 104 are coupled to the input terminals 18 and 16, respectively, of the primary winding 14 of the transformer 10 of the signal calibrating circuit of the present invention. Due to this circuit connection, voltage signals are developed in the secondary windings 20 and 38 which are opposite in polarity to the input signal applied to the amplifier 100 from the transformer 88. The voltage signals are in phase with each other. The voltage signals act as a negative feedback signal to oppose the electrical signals developed in the primary winding 86 of the transformer 88 by the D.C. source 82 when the switch 92 is closed. Accordingly, the signal calibrating circuit of the present invention functions as a negative feedback control device in the signal detection system to provide the well known advantages generally associated with negative feedback and to develop a finely controlled, highly stable negative feedback ratio for the over-all detection system.

Briefly, in operation the switch 92 is operated periodically to connect the D.C. source 82 to the winding 86. The electrical signal flowing in the primary winding 86 develops a square wave input signal 106 at the input of the amplifier 100 which is amplified and appears between the output terminals 102 and 104 as the waveform 108. The output signal, in turn, develops a negative feedback signal 110 which is applied through the signal calibrating apparatus of the present invention to the winding 86 for comparison with the magnitude of the D.C. source signal.

The range of input signals from the D.C. source 82 to which the detection system of FIGURE 3 is responsive may be varied by changing the magnitude of the feedback signal induced in the windings 20 and 38 relative to the magnitude of the output signal 108 from the amplifier 100. Thus, the sensitivity of the detection system may be readily calibrated by changing the number of turns in the windings 20 and 38.

I claim:

1. Apparatus for developing a reference signal having a predetermined finely adjustable magnitude comprising:

a first transformer having a toroidal core and a primary and a secondary winding wound thereon, the primary winding being arranged to receive an input signal, means coupled to the first transformer and responsive to the input signal applied to the primary winding for developing a control signal proportional to the magnitude of the input signal and having a magnitude substantially less than the input signal, a second transformer having a toroidal core and a primary and secondary winding wound thereon, the secondary winding of the secondary transformer being connected in series with the secondary winding of the first transformer and;

means for applying the control signal across the primary winding of the second transformer to develop the reference signal across the series connected secondary windings whereby the amplitude of the reference signal can be finely adjusted by changing the number of turns in the secondary winding of the second transformer.

2. Apparatus for developing an alternating current reference voltage having a predetermined finely adjusted magnitude comprising:

a first transformer including a primary winding for receiving an input signal, a secondary winding and a ternary winding, the number of turns in the ternary winding being substantially less than the number of turns in the primary winding, and a second transformer including a primary winding and a secondary winding, the primary winding of the second transformer being connected across the ternary winding of the first transformer to apply the voltage induced in the ternary winding across the primary winding of the second transformer, the secondary winding of the second transformer being connected in series with the secondary winding of the first transformer to develop the reference signal across the series connected secondary windings which is equal to the combined amplitudes of the voltages induced in the secondary windings, the primary winding of the second transformer having a greater number of turns than the ternary winding of the first transformer whereby the amplitude of the reference signal can be finely adjusted by changing the number of turns in the secondary winding of the second transformer.

3. The apparatus as defined in claim 2 wherein the second transformer includes a ternary winding, the number of turns in the ternary winding of the second transformer being substantially less than the number of turns in the primary winding of the second transformer, and including a third transformer having a primary winding connected across the ternary winding of the second transformer and a secondary winding connected in series with the secondary windings of the first and second transformers to develop the reference voltage across the series connected secondary windings.

4. Apparatus for comparing an alternating current test signal with a reference signal comprising;

a difference circuit for subtracting alternating current signals on a continuous time basis to develop a difference signal at its output terminals, the difference circuit having input terminals for receiving alternating signals to be subtracted, a source of the alternating current test signals, a first transformer including a primary winding for receiving an alternating current reference signal, a secondary winding and a ternary winding, the number of turns in the ternary winding being substantially less than the number of turns in the primary winding, and a second transformer including a primary winding and a secondary winding, the primary winding of the secondary transformer being connected across the ternary winding of the first transformer to apply the voltage induced in the ternary winding across the primary winding of the transformer, the secondary winding of the second transformer being connected in series with the secondary winding of the first transformer to develop the reference signal across the series connected secondary winding which is equal to the combined amplitudes of the voltages induced in the secondary windings and means for coupling the reference signal in series with the alternating current test signal across the input terminals of the difference circuit.

5. The apparatus as defined in claim 4 wherein the second transformer includes a ternary winding, the number of turns in the ternary winding of the second transformer being substantially less than the number of turns in the primary winding of the second transformer, and including a third transformer having a primary winding connected across the ternary winding of the second transformer and a secondary winding connected in series with the secondary winding of the first and second windings to develop the reference voltage across the series connected secondary windings whereby the magnitude of the reference signal can be finely adjusted by changing the number of turns in the secondary windings of the second and third transformers.

References Cited by the Examiner

UNITED STATES PATENTS

| | | | |
|---|---|---|---|
| 2,779,870 | 1/1957 | Henry et al. | 328—146 |
| 2,901,563 | 8/1959 | McAdam et al. | 330—9 |
| 3,025,453 | 3/1962 | Malsbary | 323—45 X |
| 3,047,784 | 7/1962 | Hardway | 323—45 X |
| 3,079,545 | 2/1963 | Kretsch et al. | 323—45 X |
| 3,114,874 | 12/1963 | Kornbluh et al. | 323—48 X |

ARTHUR GAUSS, *Primary Examiner.*